United States Patent [19]

Humphries et al.

[11] Patent Number: 5,319,984
[45] Date of Patent: Jun. 14, 1994

[54] DEVICE AND METHOD OF MONITORING TORQUE OR FORCE

[76] Inventors: Glyn A. Humphries, 9 Grayshott Laurels, Lindford, Hampshire; Ronald Sangster, 10 Addison Road, Banbury, Oxfordshire, both of England

[21] Appl. No.: 47,070

[22] Filed: Apr. 15, 1993

Related U.S. Application Data

[63] Continuation of Ser. No. 710,409, Jun. 5, 1991, abandoned.

[30] Foreign Application Priority Data

Jun. 5, 1990 [GB] United Kingdom ............... 9012498

[51] Int. Cl.⁵ ................................................ G01L 5/24
[52] U.S. Cl. ...................... 73/862.21; 73/862.23
[58] Field of Search .......... 73/862.08, 862.21, 862.23, 73/847; 209/546; 53/331.5, 490

[56] References Cited

U.S. PATENT DOCUMENTS

| | | | |
|---|---|---|---|
| 2,552,407 | 5/1951 | Crabbe | 73/862.21 |
| 4,432,246 | 2/1984 | Granat | 73/862.62 |
| 4,616,466 | 10/1986 | Tanaka et al. | 53/331.5 |
| 4,674,340 | 6/1987 | Burt et al. | 73/862.23 |
| 4,700,576 | 10/1987 | Grare et al. | 73/862.21 |

FOREIGN PATENT DOCUMENTS 2480940 10/1981 France ..................... 73/862.21

Primary Examiner—Richard E. Chilcot, Jr.
Assistant Examiner—Elizabeth L. Dougherty
Attorney, Agent, or Firm—Jacobson, Price, Holman & Stern

[57] ABSTRACT

A device and a method using such a device to monitor torque or force applied in automatic capping machinery, comprising a dummy body, a neck part on the dummy body and torque or force indicator means. The dummy body is shaped to perform as a container body in such capping machinery. The neck part has the form of the neck of a container which is capped by such machinery. The torque or force indicator means are connected to the neck part of the device and are incorporated in the device so as to provide an indication of a torque or force applied to the neck part.

2 Claims, 5 Drawing Sheets

SECTION ON X-X

DEVICE AND METHOD OF MONITORING TORQUE OR FORCE

This application is a continuation of application Ser. No. 07/710,409, filed Jun. 5, 1991 now abandoned.

The present invention relates to a device for use in monitoring torque and extends to a method of monitoring torque.

In a production bottling plant, empty containers are fed to a conveyor system and at specific stations along the conveyor the containers are typically filled, capped, labelled and packed by automatic machinery.

At the capping station in some such plants, screw-threaded caps are placed on the necks of correspondingly screw-threaded containers, whereafter the caps are screwed by a rotary system which normally applies a fixed number of turns (or a fraction of a turn). The container is then released and passes to the next station on the conveyor.

At the time a cap meets a container neck at the capping station, the angular position of the thread on the cap relative to the thread on the neck of the container may be random. As a result, tightening does not commence at the same place in the rotational cycle of the threads, from one container to the next. Thus it is possible for different caps to be tightened to quite different torque figures by the time they leave the capping station.

At present damage to the container by over-tightening is avoided by use of a slipping clutch mechanism in the rotary system, to prevent further rotation of the cap once a limiting torque has been reached. However this does not stop containers with loose caps, or caps which are insufficiently tightened, leaving the machine. Furthermore, a change in the temperature of the slipping clutch mechanism may still result in a cap being over-tightened.

An aim of the present invention is to provide a remedy to the problem of loose caps or insufficiently tightened caps, and/or to the problem of over-tightening caps.

Accordingly the present invention is for use in monitoring torque applied to an externally screw-threaded neck part of a container by automatic capping machinery, which applies an internally screw-threaded cap to such a neck to a given degree of tightness by imparting a predetermined rotary movement to the cap relative to the neck, and is directed to a device comprising a dummy body, shaped to perform as a container body in such machinery, an externally screw-threaded neck part having the form of the neck of a container which is capped by such machinery, a substantially rigid stem secured rigidly to the neck part and to the dummy body, at least one strain gauge which is bonded along the outside surface of the stem to provide an indication of a torque applied to the neck part, and electrical-signal generating means within the dummy body, in which the strain gauge is connected to the electrical-signal generating means to generate an electrical signal when the device is in use, which is indicative of the torque applied by such capping machinery to the neck part, whereby such an indication is obtained without rotational displacement of the neck part relative to the dummy body.

The device may be part of control apparatus for capping machinery by means of which apparatus the device is repeatedly passed through the machinery and torque indications are taken from it, and any necessary adjustments made to the machinery to ensure that the torque applied by the machinery at the capping station remains within predetermined limits.

The present invention extends to a method of monitoring torque applied in automatic capping machinery, comprising inserting a torque indicator device on a conveyor of the machinery upstream of a capping station thereof, the device having a form corresponding to that of a container which is capped by the machinery and having means to provide an indication of the torque applied at the capping station, and removing the device downstream of the capping station. The torque applied at the capping station may then be adjusted in dependence upon the torque or force indication provided by the device.

Examples of devices made in accordance with the present invention are shown in the accompanying drawings in which.

Figure 1:
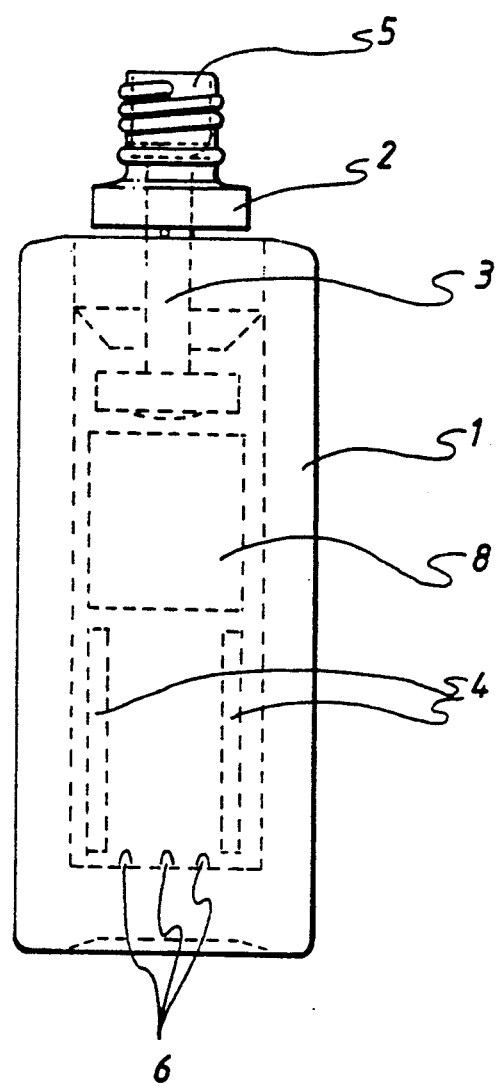
FIG. 1 shows a side view of such a device.
Figure 2:
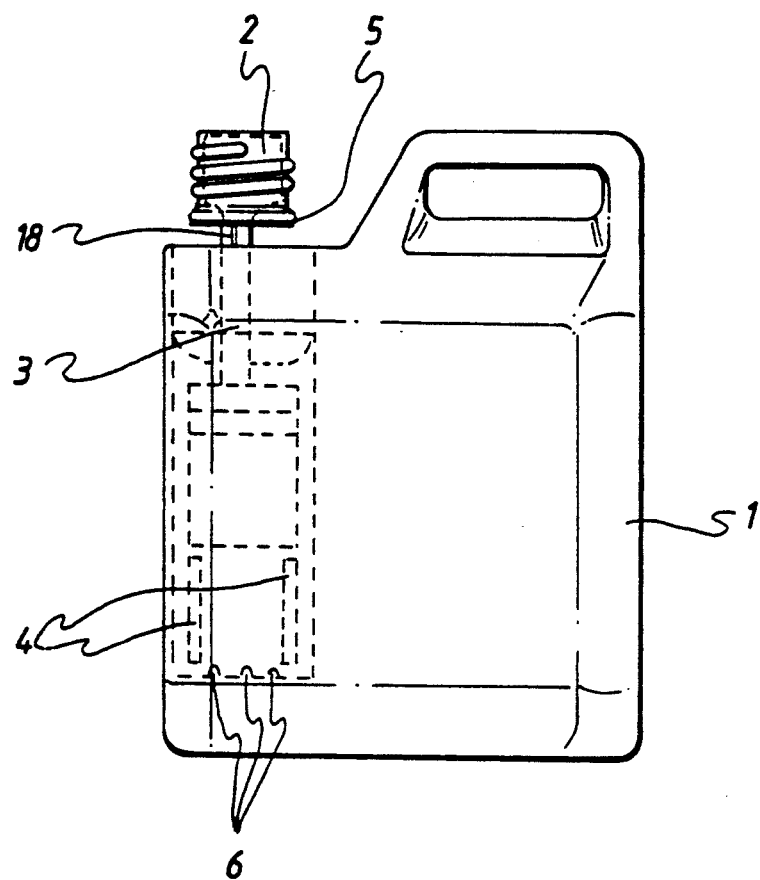
FIG. 2 shows a side view of a further such device.

FIGS. 1 and 2 show respective container-like devices each with a machined synthetic plastics body 1, shaped to perform as a dummy container body in capping machinery. Mounted on the body 1 is a stainless steel drive head 2 provided with a neck part 5 which has the form of the neck of a container which is capped by such machinery. The connection between the body 1 and the drive head 2 includes a torque recorder 3. The latter incorporates electronic circuitry 4 connected within the recorder 3 to provide signals indicative of a torque applied to the neck part 5 and to store at least the peak values of such signals for subsequent reference. A battery 8 is provided in the recorder 3 to power the electronics to enable such values to be stored electronically. Output, input and reset terminals 6 of the electronic circuitry 4 are provided on the base of the recorder 3 and are accessible by removal of the recorder from the body 1.

Figure 3A:
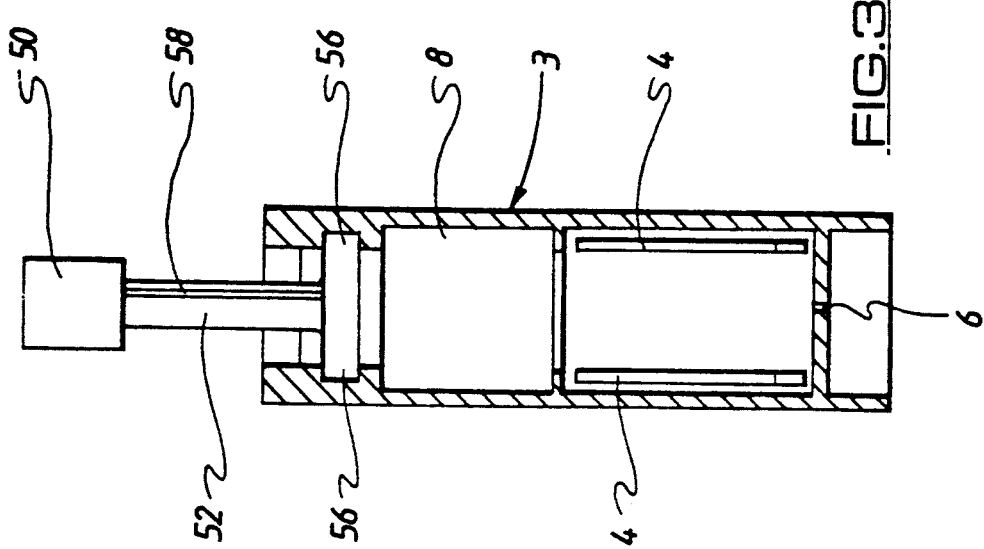
FIG. 3a is a cross-section of the torque recorder shown in FIG. 3 along the line X—X.
Figure 3:
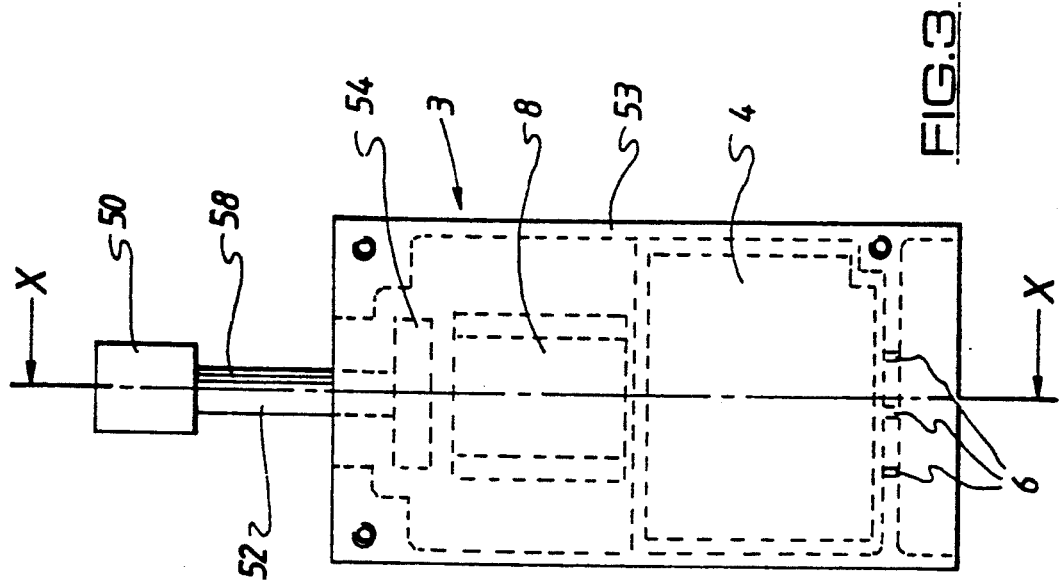
FIG. 3 is a front view of a torque recorder of each of the devices shown in FIGS. 1 and 2.

FIGS. 3 and 3a show the torque recorder 3 for such devices in greater detail. A transducer head 50 of the recorder 3 is mounted on a stem 52 which projects upwardly from a housing 53 for the battery 8 and the electronic circuitry 4. The stem 52 is fixed rigidly to the housing 53 by means of a flange 54 at the lower end of the stem 52, the flange 54 being clamped tightly around its edge 56 in the housing walls. Resistance strain gauges 58 extend along and are bonded to the outside surface of the stem 52. The housing 53 of the recorder 3 contains within it the electronic circuitry 4 which is connected to the strain gauges 58 to provide signals which are indicative of the torque applied to the neck part 5, and hence to the head 50, and to store the peak values of such signals for subsequent reference.

Figure 4:
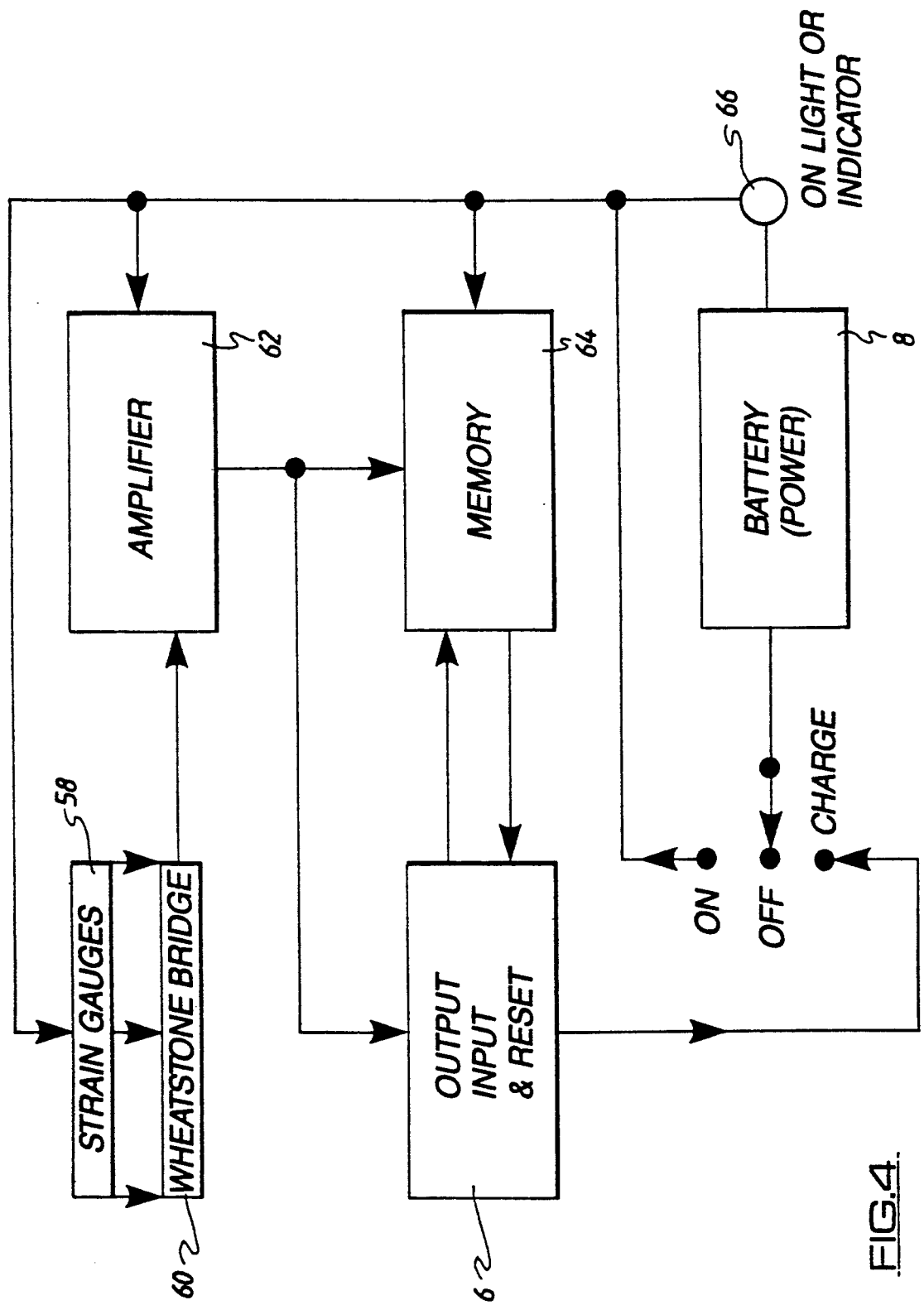
FIG. 4 is a block diagram of electronic circuitry of the recorder shown in FIG. 3.

The electronic circuitry 4 shown in FIGS. 1 to 3 is shown in greater detail in FIG. 4. Thus the resistance strain gauges 58 of the torque recorder 3 shown in FIGS. 3 and 3a are connected in a Wheatstone bridge 60 of the circuitry 4, and are so arranged that a torque applied to the drive head 2 via the neck part 5 of the device, operates on the resistance strain gauges 58 thereby altering the output from the bridge 60. The latter output is passed to an amplifier 62 to increase the electrical torque signal to a usable level. The amplifier 62 has an output which sends the torque signal to:
  i) the output terminal of the terminals 6 to relay the signal to an external recording and/or display device; and
  ii) to an input of an analog memory circuit 64.

When the device has made a measurement and stored the value, this value may be read by connecting a cable between the output of the terminals 6 and a display instrument (not shown).

This instrument may have an analogue meter or an analogue-to-digital converter with a digital display to show torque as a force value. This may be in engineering units of measurement. The display instrument may also have the means to reset the memory of the container-like device, and to allow the device to have a "Track" facility whereby the device reads directly to the instrument display rather than via the memory. This allows calibration of the device. Such calibration may involve the use of preset electrical torque signals and/or the application of mechanical torque to the device recorder 3 to allow the setting of true output torque levels. This instrument may also have the facility to recharge the battery in the recorder, via the input of the terminals 6. It may also have means to test electrically to full scale the operation of the device.

Figure 5:
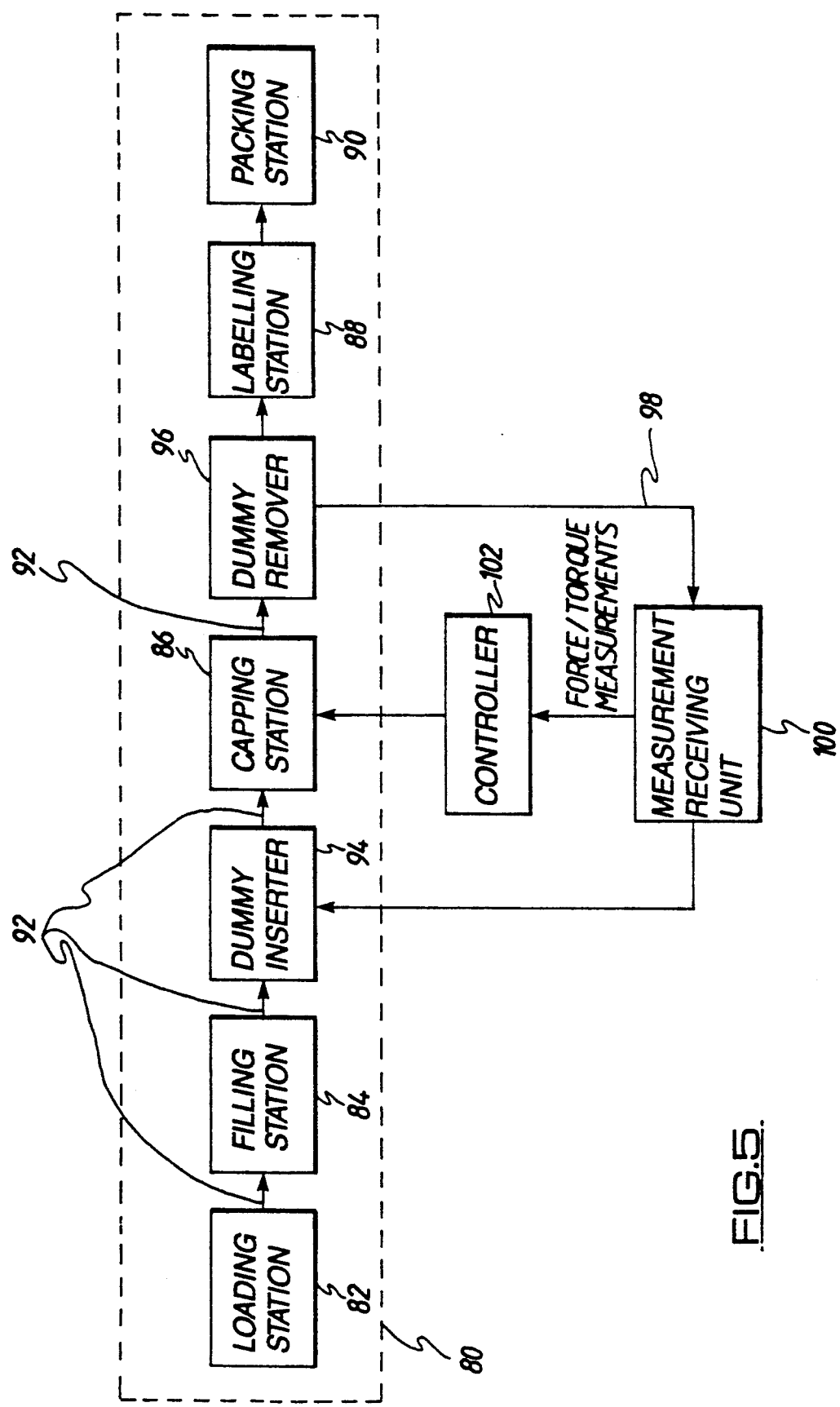
FIG. 5 is a block diagram of an automatic return and control system in automatic capping machinery using such a device.

In FIG. 5 there is shown diagrammatically a production bottling plant 80. It comprises in series a loading station 82, a filling station 84, a capping station 86, a labelling station 88 and a packing station 90. Each station is interconnected by means of a conveyor 92. Empty containers (not shown) having externally screw-threaded necks are loaded on to the machinery at the loading station 82 from which they are transferred to the filling station 84 by means of the conveyor 82. At this station the containers are filled with a product and from there they are transferred by the conveyor 82 to the capping station 86. At this station an internally screw-threaded cap (not shown) is placed on the neck of each container, and rotated by means of a rotary system (not shown) to secure the cap to the bottle. The capped bottles pass from the capping station 86 to the labelling station 88 where they are appropriately labelled, and from thence they pass to the packing station 90.

The device shown in FIG. 1, for example, may be inserted on to the conveyor 92 anywhere upstream of the capping station 86, and removed anywhere downstream thereof. The measurement provided at its output terminal of the terminals 6 may then be read by means of an appropriate display device (not shown) connected to that terminal.

The operator may then adjust the torque applied at the capping station 86 according to the measurement thus read. Thus, if the torque applied is too great, he may adjust the machinery at the capping station 86 to reduce the torque it applies, and conversely if the reading taken from the torque measuring device is too low, he may increase the torque which is applied at the capping station 86.

Alternatively, automatic means may be provided for inserting and removing the torque monitoring device. Thus, with reference to FIG. 5, a dummy inserter 94 may be provided along the conveyor 92 between the filling station 84 and the capping station 86, and an automatic remover may be positioned along the conveyor 92 between the capping station 86 and the labelling station 88. A second conveyor 98 may be provided to transfer the torque monitoring device from the remover 96 to the inserter 94 via a measurement receiving unit 100. The latter is connected to a controller 102 of the capping station 86 and transfers the signal received by the torque monitoring device to the controller 102. The controller 102 makes any adjustment dictated by the measurement to the torque applied by the capping station 86.

Numerous modifications and variations of the torque monitoring device may readily occur to the reader without taking it outside the scope of the present invention. Thus, for example, where the adjustment to the torque applied at the capping station 86 is made manually, an LCD display may be provided on the device to provide immediate readout of the measurement made by the device. A reset button to reset the measurement stored in the device back to zero may also be provided directly on the device itself. Alternatively, a radio transmitter may be provided in the device to enable it to communicate the measurement it has made to a radio-receiver incorporated in a controller of the capping station.

We claim:
1. A device comprising a dummy body, shaped to perform as a container body in automatic capping machinery, an externally screw-threaded neck part having the form of the neck of a container which is capped by such machinery, a substantially rigid stem secured rigidly to the neck part and to the dummy body, at least one strain gauge which is bonded along the outside surface of the stem to provide an indication of a torque applied to the neck part, and electrical-signal generating means within the dummy body, in which the strain gauge is connected to the electrical-signal generating means to generate an electrical signal when the device is in use, which is indicative of the torque applied by such capping machinery to the neck part, whereby such an indication is obtained without rotational displacement of the neck part relative to the dummy body.

2. A device comprising a dummy body, shaped to perform as a container body in automatic capping machinery, an externally screw-threaded neck part having the form of the neck of a container which is capped by such machinery, a substantially rigid stem secured rigidly to the neck part and to the dummy body, at least one strain gauge which is bonded along the outside surface of the stem to provide an indication of a torque applied to the neck part, and electrical signal generating means within the dummy body, the electrical signal generating means comprising:
  a) a Wheatstone bridge connected to the strain gauge so as to convert the applied torque into an electrical signal;
  b) an amplifier connected to receive such a signal from the Wheatstone bridge; and
  c) memory means connected to receive a signal from the amplifier and to store a measured value of said applied torque;

whereby such an indication is obtained without rotational displacement of the neck part relative to the dummy body.

* * * * *